US008017529B1

(12) United States Patent
Arvidson et al.

(10) Patent No.: US 8,017,529 B1
(45) Date of Patent: *Sep. 13, 2011

(54) CROSS-PLIED COMPOSITE BALLISTIC ARTICLES

(75) Inventors: Brian D. Arvidson, Chester, VA (US); Henry G. Ardiff, Chesterfield, VA (US); Ashok Bhatnagar, Richmond, VA (US); David A. Hurst, Richmond, VA (US); Lori L. Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 1210 days.

This patent is subject to a terminal disclaimer.

(21) Appl. No.: 11/726,069

(22) Filed: Mar. 21, 2007

(51) Int. Cl.
*B32B 27/04* (2006.01)

(52) U.S. Cl. ............ 442/134; 2/2.5; 428/105; 428/911; 89/36.05

(58) Field of Classification Search ........ 2/2.5; 89/36.01, 89/36.02, 36.05; 428/102, 112, 902, 908.8, 428/911; 442/135, 239, 241, 246, 247, 248, 442/255, 263, 265, 266, 268, 269, 271, 277, 442/286, 326, 394

See application file for complete search history.

(56) References Cited

U.S. PATENT DOCUMENTS

| | | | |
|---|---|---|---|
| 3,671,542 A | 6/1972 | Kwolek et al. | 524/157 |
| 3,975,487 A | 8/1976 | Cottis et al. | 264/210.6 |
| 4,118,372 A | 10/1978 | Schaefen | 528/190 |
| 4,137,394 A | 1/1979 | Meihuizen et al. | 528/100 |
| 4,161,470 A | 7/1979 | Calundann | 524/599 |
| 4,356,138 A | 10/1982 | Kavesh et al. | 264/164 |
| 4,413,110 A | 11/1983 | Kavesh et al. | 526/348.1 |
| 4,430,383 A | 2/1984 | Smith et al. | 428/364 |
| 4,436,689 A | 3/1984 | Smith et al. | 264/204 |
| 4,440,711 A | 4/1984 | Kwon et al. | 264/185 |
| 4,457,985 A | 7/1984 | Harpell et al. | 428/224 |
| 4,535,027 A | 8/1985 | Kobashi et al. | 428/364 |
| 4,536,536 A | 8/1985 | Kavesh et al. | 524/462 |
| 4,545,950 A | 10/1985 | Motooka et al. | 264/210.6 |
| 4,551,296 A | 11/1985 | Kavesh et al. | 264/203 |
| 4,599,267 A | 7/1986 | Kwon et al. | 428/364 |
| 4,612,148 A | 9/1986 | Motooka et al. | 264/49 |
| 4,617,233 A | 10/1986 | Ohta et al. | 428/364 |
| 4,623,574 A | 11/1986 | Harpell et al. | 428/113 |
| 4,663,101 A | 5/1987 | Kavesh et al. | 264/178 F |
| 4,737,402 A | 4/1988 | Harpell et al. | 442/187 |
| 4,748,064 A | 5/1988 | Harpell et al. | 428/113 |
| 4,916,000 A | 4/1990 | Li et al. | 428/105 |
| 5,173,138 A | 12/1992 | Blauch et al. | 156/177 |
| 5,246,657 A | 9/1993 | Yagi et al. | 264/210.6 |
| 5,286,435 A | 2/1994 | Slutsker et al. | 264/205 |
| 5,286,833 A | 2/1994 | Bubeck et al. | 528/183 |
| 5,296,185 A | 3/1994 | Chau et al. | 264/205 |
| 5,342,567 A | 8/1994 | Chen et al. | 264/203 |
| 5,356,584 A | 10/1994 | Bubeck et al. | 264/205 |
| 5,395,671 A * | 3/1995 | Coppage et al. | 428/102 |
| 5,534,205 A | 7/1996 | Faley et al. | 264/103 |
| 5,552,208 A | 9/1996 | Lin et al. | 428/113 |
| 5,578,374 A | 11/1996 | Dunbar et al. | 428/364 |
| 5,674,969 A | 10/1997 | Sikkema et al. | 528/183 |
| 5,702,657 A | 12/1997 | Yoshida et al. | 264/112 |
| 5,724,670 A * | 3/1998 | Price | 2/2.5 |
| 5,736,244 A | 4/1998 | Kavesh et al. | 428/364 |
| 5,741,451 A | 4/1998 | Dunbar et al. | 264/103 |
| 5,766,725 A | 6/1998 | Hogenboom et al. | 428/113 |
| 5,939,553 A | 8/1999 | Reichwein et al. | 546/250 |
| 5,945,537 A | 8/1999 | Sikkema | 546/307 |
| 5,958,582 A | 9/1999 | Dunbar et al. | 428/364 |
| 5,972,498 A | 10/1999 | Kavesh et al. | 428/364 |
| 6,000,055 A * | 12/1999 | Citterio | 2/2.5 |
| 6,040,050 A | 3/2000 | Kitagawa et al. | 428/364 |
| 6,040,478 A | 3/2000 | Sikkema et al. | 562/424 |
| 6,119,575 A | 9/2000 | Dragone et al. | |
| 6,448,359 B1 | 9/2002 | Kavesh | 526/352 |
| 6,642,159 B1 | 11/2003 | Bhatnagar et al. | 442/134 |
| 7,148,162 B2 * | 12/2006 | Park et al. | 442/134 |
| 7,601,416 B2 * | 10/2009 | Palley | 428/171 |
| 2005/0093200 A1 | 5/2005 | Tam et al. | 264/211.14 |
| 2008/0075933 A1 * | 3/2008 | Rovers | 428/196 |

FOREIGN PATENT DOCUMENTS

| | | |
|---|---|---|
| WO | WO2005090072 | 9/2005 |
| WO | WO2006124825 | 11/2006 |

* cited by examiner

*Primary Examiner* — Arti Singh-Pandey

(57) ABSTRACT

A multilayered composite fabric, the composite fabric comprising a first fabric comprising first and second non-woven unidirectionally oriented fiber layers. Each of the fiber layers is in a resin matrix and the fibers comprise high tenacity fibers. The fibers in the two fiber layers are disposed at an angle with respect to each other. The composite fabric includes a second fabric comprising multi-directionally oriented fibers optionally in a resin matrix. The second fabric also comprises high tenacity fibers. The first and second fabrics are bonded together to form the composite fabric, which has improved ballistic resistant properties. Plastic films may be adhered to one or both outer surfaces of the first fabric and can serve as the bonding agent between the two fabrics. Also described is a method of making a composite fabric.

27 Claims, No Drawings

CROSS-PLIED COMPOSITE BALLISTIC ARTICLES

BACKGROUND OF THE INVENTION

1. Field of the Invention

This invention relates to composite materials which are useful for ballistic and other applications, and to a method for their manufacture.

2. Description of the Related Art

Ballistic resistant products are known in the art. They may be of the flexible or rigid type. Many of these products are based on high tenacity fibers, and are used in such applications as body armor, such as bullet-resistant vests.

One popular type of ballistic resistant product is made from unidirectionally oriented high tenacity fibers, such as high tenacity polyethylene fibers or aramid fibers. Although such products have desirable ballistic resistant properties, there continues to be a need to provide products with enhanced properties.

Accordingly, it would be desirable to provide a ballistic resistant product that has improved ballistic properties.

SUMMARY OF THE INVENTION

In accordance with this invention, there is provided a multilayered composite fabric, the composite fabric comprising:

(a) a first fabric comprising a first fiber layer and a second fiber layer, the first fiber layer comprising non-woven unidirectionally oriented fibers in a first resin matrix, the fibers comprising high tenacity fibers, the first fiber layer comprising first and second surfaces, the second fiber layer comprising non-woven unidirectionally oriented fibers in a second resin matrix, the fibers comprising high tenacity fibers, the second fiber layer comprising first and second surfaces, the first surface of the second fiber layer being adjacent to the second surface of the first fiber layer, the fibers in the second fiber layer being arranged at an angle with respect to the direction of the unidirectionally oriented fibers of the first fiber layer; and (b) a second fabric comprising multi-directionally oriented fibers optionally in a third resin matrix, the second fabric comprising high tenacity fibers, the second fabric having first and second surfaces, the first surface of the second fabric being adjacent to the second surface of the second fiber layer, and the second fabric being directly or indirectly bonded to the first fabric thereby forming the composite fabric.

Further in accordance with this invention, there is provided a multilayered composite fabric, the composite fabric comprising:

(a) a first fabric comprising a first fiber layer and a second fiber layer, the first fiber layer comprising non-woven unidirectionally oriented fibers in a first resin matrix, the fibers comprising high tenacity fibers, the first fiber layer comprising first and second surfaces, the second fiber layer comprising non-woven unidirectionally oriented fibers in a second resin matrix, the fibers comprising high tenacity fibers, the second fiber layer comprising first and second surfaces, the first surface of said second fiber layer being in contact with the second surface of the first fiber layer, the fibers in the second fiber layer being arranged at an angle with respect to the direction of the unidirectionally oriented fibers of the first fiber layer;

(b) optionally, a first plastic film bonded to the first surface of the first fiber layer of said first fabric;

(c) a second plastic film bonded to the second surface of the second fiber layer of the first fabric; and (d) a second fabric comprising multi-directionally oriented fibers optionally in a third resin matrix, the second fabric comprising high tenacity fibers, the second fabric having first and second surfaces, the first surface of the second fabric being bonded to the second plastic film.

Also in accordance with this invention, there is provided a method of forming a composite fabric structure, the method comprising:

(a) supplying a first fiber layer comprising non-woven unidirectionally oriented fibers in a first resin matrix, the fibers comprising high tenacity fibers, the first fiber layer comprising first and second surfaces;

(b) supplying a second fiber layer comprising non-woven unidirectionally oriented fibers in a second resin matrix, the fibers comprising high tenacity fibers, the second fiber layer comprising first and second surfaces;

(c) bonding the first and second fiber layers together such that the first surface of the second fiber layer is bonded to the second surface of the first fiber layer, the fibers in the second fiber layer being arranged at an angle with respect to the direction of the unidirectionally oriented fibers of the first fiber layer;

(d) optionally applying a first plastic film to the first surface of the first fiber layer;

(e) applying a second plastic film to the second surface of the second fiber layer;

(f) supplying a second fabric comprising multi-directionally oriented fibers optionally in a third resin matrix, the second fabric comprising high tenacity fibers, the second fabric having first and second surfaces; and (g) bonding the first surface of said second fabric to the second plastic film to thereby form the composite fabric.

The invention provides a first fabric which comprises two fibrous layers of unidirectionally oriented fibers that are arranged at an angle with respect to each other (commonly referred to as "cross plied"). The first fabric is bonded to a second fabric which comprises multi-directionally oriented fibers. Additionally layers can be present in the composite structure, such as plastic films on one or both surfaces of the first fabric. When present on the bottom surface of the second fibrous layer, the plastic film bonds the first and second fabrics together. Other layers may be employed and several layers of the composite fabric may be used to form desired products, such as ballistic resistant products.

Surprisingly, it has been found that the composite structure has improved ballistic performance when compared to a similar structure in which the first and second fabrics are not bonded together. In addition, it has been surprisingly found that the back face deformation can be reduced by bonding the two fabric layers together.

DETAILED DESCRIPTION OF THE INVENTION

The present invention comprises a multilayered composite fabric which is formed from at least a first fabric layer and a second fabric layer. The fibers in both of the first and second fabric layers comprise high tenacity fibers, and the layers are bonded together, directly or indirectly.

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Fibers may also be in the form of split film or tape.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably circular.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

High strength fibers useful in the yarns and fabrics of the invention include highly oriented high molecular weight polyolefin fibers, particularly high modulus (or high tenacity) polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and mixtures and blends thereof. Preferred high strength fibers useful in this invention include polyolefin fibers (more preferably high tenacity polyethylene fibers), aramid fibers, polybenzazole fibers, graphite fibers, and mixtures and blends thereof. Most preferred are high tenacity polyethylene fibers and/or aramid fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are available, for example, under the trademark SPECTRA® fibers and yarns from Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 weight percent of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and U.S. patent application publication 2005/0093200, the disclosures of which are expressly incorporated herein by reference to the extent not inconsistent herewith.

In the case of aramid fibers, suitable fibers formed from aromatic polyamides are described, for example, in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., the disclosure of which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Liquid crystal copolyester fibers are available under the designation Vectran® fibers from Kuraray America Inc.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Preferably, the fibers in the first fabric layer are selected from the group of high tenacity polyolefin fibers (more preferably high tenacity polyethylene fibers), aramid fibers, PBO fibers, graphite fibers and blends thereof. Likewise, the fibers in the second fabric layer are selected from the same group of fibers.

The fabric layers of this invention are preferably formed from all or substantially all high tenacity fibers. Alternatively, at least about 50% by weight of the fibers in the fabric layers are high tenacity fibers and more preferably at least about 75% by weight of the fibers in the fabric layers are high tenacity fibers.

The first fabric is in the form of a non-woven fabric of high tenacity unidirectionally oriented fibers. The first fabric has a plurality of fiber layers, and each of the fiber layers includes unidirectionally oriented fibers. As is known, in such an arrangement the unidirectionally oriented fibers of each layer are aligned parallel to one another along a common fiber direction. The unidirectionally oriented fiber layers may include a minor amount of a material which provides some cross-directional stability to the product; such material may be in the form of fibers, yarns or adhesive yarns all of which are not high tenacity materials, or resins, adhesives, films and the like that may be spaced along the length of the unidirectionally oriented fiber layer but extend at an angle thereto. Such materials, if present, may comprise up to about 10%, more preferably up to about 5%, by weight of the total weight of each fiber layer.

The first fabric may be constructed via a variety of methods. Each of the fiber layers forming the first fabric is preferably formed by supplying yarn bundles of the high tenacity filaments from a creel and led through guides and into a collimating comb. The collimating comb aligns the filaments coplanarly and in a substantially unidirectional fashion. The fibers may then be led into one or more spreader bars which may be included in the coating apparatus, or may be located before or after the coating apparatus.

The fiber layers of the first fabric are coated with a matrix resin composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. Preferably the matrix resin of each of the fiber layers of the first fabric has the same or similar chemical structure so that the layers can be readily bonded to each other.

Typical methods for forming each of the fiber layers are described, for example, in U.S. Pat. Nos. 5,552,208 and 6,642,159, the disclosures of which are expressly incorporated herein by reference to the extent not inconsistent herewith.

At least two of the fiber layers of the first fabric are combined in a manner such that the angles of orientation of the layers are different. These fiber layers may be cross-plied in a manner known in the art. For example, the fibers in the first fiber layer extend preferably 90° from the fibers in the second fiber layer. The angles of rotation of the fibers in the various fiber layers may be any chosen angles, such as 0°/90°, 0°/90°/0°/90°, or 0°/45°/90°/45°/0° or other angles. Such rotated unidirectional alignments are described, for example, in U.S. Pat. Nos. 4,623,574; 4,737,402; 4,748,064; and 4,916,000.

The first and second fiber layers of the first fabric may be bonded together by any desired technique. For example, the matrix resin or resins of the two layers may be employed as the bonding agent. Alternatively, the two fiber layers may be bonded by means of an adhesive, a plastic film, or any other suitable means.

In one preferred embodiment, two fiber layers are cross-plied in a 0°/90° configuration or in an approximate 0°/90° configuration and then consolidated to form the first fabric layer. The two fiber network layers can be continuously cross-plied, preferably by cutting one of the fiber layers into lengths that can be placed successively across the width of the other network in a 0°/90° orientation. Equipment for the continuous cross-plying of fibrous layers is known, and such is described, for example, in U.S. Pat. Nos. 5,173,138 and 5,766,725. The resulting continuous two-ply first fabric can then be wound into a roll, preferably with a layer of separation material between each adjacent two-ply structure.

The high tenacity fibers of the first fiber layer and the second fiber layer may be the same or be chemically different fibers. For ease of manufacturing, the high tenacity fibers of each fiber layer is the same, but in some constructions it may be desired to have the fibers in each fiber layer to be different so as to combine the different properties of the each fiber material. Examples of the first fabric construction include high tenacity polyethylene fibers used as the fibers in both fiber layers, aramid fibers used as the fibers in both fiber layers, high tenacity polyethylene fibers used as the fibers in a first fiber layer and aramid fibers used as the fibers in a second fiber layer, aramid fibers used as the fibers in a first fiber layer and high tenacity polyethylene fibers used as the fibers in the second fiber layer, as well as other constructions using any of the high tenacity fibers mentioned above.

As mentioned above, the first fabric may be formed from more than two fiber layers, and any desired number of fiber layers may be employed in the first fabric. For example, the first fabric may be a four ply structure, in which adjacent fiber layers are oriented with respect to each other, preferably at 90°.

With respect to the second fabric, it is preferred that the second fabric layer is not coated with a matrix resin. Alternatively, the second fabric may be coated with a matrix resin, preferably of the same or similar chemical structure as are in the fiber layers of the first fabric.

The matrix resin composition may be applied as a solution, dispersion or emulsion, or the like, onto the fibers of the fiber layers that form the first fabric layer. The matrix resin may be applied by any desired technique, such as by spraying, dipping, roller coating, hot melt coating, or the like. The coated fabric layer or layers may then be passed through an oven for drying in which they are subjected to sufficient heat to evaporate the water or other solvent in the matrix resin composition.

The second fabric layer is also formed from high tenacity fibers, but the fibers are oriented in multiple directions in the fabric. That is, the fibers in the second fabric are multi-directionally oriented. This means that there are sufficient fibers which extend in a second direction from the major direction of the fabric to provide some degree of cross direction strength to the fabric. The term "multi-directionally oriented fibers" is distinct from "unidirectionally oriented fibers".

The second fabric may be in the form of a woven fabric, a knitted fabric, a braided fabric, a felted fabric, a paper fabric, and the like. Preferably the second fabric is in the form of a woven fabric. This second fabric layer may be referred to as a ballistic textile product.

As mentioned above, the high tenacity fibers in the second fabric layer are chosen from the same group of fibers mentioned above with respect to the first fabric layer. Preferably, the fibers in the second fabric layer are also selected from the group of high tenacity polyolefin fibers (more preferably high tenacity polyethylene fibers), aramid fibers, PBO fibers, graphite fibers and blends thereof. Most preferably, such fibers are high tenacity polyethylene fibers and/or aramid fibers.

If a woven fabric is employed, it may be of any weave pattern, including plain weave, basket weave, twill, satin, three dimensional woven fabrics, and any of their several variations. Plain and basket weave fabrics are preferred and more preferred are such fabrics having an equal warp and weft count. In one embodiment as mentioned above, the woven fabric does not include a resin matrix. In another embodiment, the woven fabric may include a resin matrix prior to bonding to the first fabric.

The yarns of the woven fabric may be twisted, over-wrapped or entangled. The second fabric may be woven with yarns having different fibers in the warp and weft directions, or in other directions. For example, a woven fabric may be formed with aramid fibers in the warp direction and high tenacity polyethylene fibers in the weft direction, or vice versa.

As mentioned above, the second fabric may alternatively be in the form of a knitted fabric. Knit structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

The second fabric may alternatively be formed from a non-woven fabric such as a fabric in the form of a felt, such as needle punched felts. A felt is a non-woven network of randomly oriented fibers, preferably at least one of which is a discontinuous fiber, preferably a staple fiber having a length ranging from about 0.25 inch (0.64 cm) to about 10 inches (25 cm). These felts may be formed by several techniques known in the art, such as by carding or fluid laying, melt blowing and spin laying. The network of fibers is consolidated mechanically such as by needle punching, stitch-bonding, hydro-entanglement, air entanglement, spun bond, spun lace or the like, chemically such as with an adhesive, or thermally with a fiber to point bond or a blended fiber with a lower melting point.

Alternatively, the second fabric may be in the form of a paper fabric that may be formed, for example, by pulping a liquid containing the high tenacity fibers.

In another embodiment, the second fabric may be in the form of a multilayer composite fabric, such as a fabric that includes a third layer which may be a unidirectionally oriented fabric or a multi-directionally oriented fabric. The third layer is also preferably formed from high tenacity fibers.

The yarns useful in the various fibrous layers may be of any suitable denier, and may be of the same or different deniers in each layer. For example, the yarns may have a denier of from about 50 to about 3000. The selection is governed by considerations of ballistic effectiveness, other desired properties, and cost. For woven fabrics, finer yarns are more costly to manufacture and to weave, but can produce greater ballistic effectiveness per unit weight. The yarns are preferably from about 200 denier to about 3000 denier. More preferably, the yarns are from about 400 denier to about 2000 denier. Most preferably, the yarns are from about 500 denier to about 1600 denier.

The matrix resin for the fiber layers of the first fabric and of the second or additional fabrics (if present) may be formed from a wide variety of thermoplastic, thermosetting or elastomeric materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

Alternatively, the matrix resin may be selected to have a high tensile modulus when cured, as at least about $1 \times 10^5$ psi (690 MPa). Examples of such materials are disclosed, for example, in U.S. Pat. No. 6,642,159, the disclosure of which is expressly incorporated herein by reference to the extent not inconsistent herewith.

The proportion of the resin matrix material to fiber in the composite layers may vary widely depending upon the end use. The resin matrix material preferably forms about 1 to about 98 percent by weight, more preferably from about 5 to about 95 percent by weight, and still more preferably from about 5 to about 40 percent by weight, and most preferably from about 10 to about 25 percent by weight, based on the total weight of the fibers and resin matrix.

A wide variety of elastomeric materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly(isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins for polyethylene fiber fabrics include at least one vinyl ester, diallyl phthalate, and optionally a catalyst for curing the vinyl ester resin.

One preferred group of materials for polyethylene fiber fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene and/or polybutadiene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer, or an A-B-A type of elastomer. A preferred resin matrix is an styrene-isoprene-styrene block copolymer, such as Kraton® D1107 styrene-isoprene-styrene block copolymer available from Kraton Polymer LLC.

One preferred matrix resin for aramid fibers is a polyurethane resin, such as a water-based polyurethane resin.

In one preferred embodiment, the matrix resin is chosen such that the composite fabric is flexible, and is useful in such applications as soft armor products and the like.

The second fabric is bonded to the first fabric preferably after the layers of the first fabric are bonded together. Any suitable means of bonding the first fabric to the second fabric may be employed. For example, where the second fabric is directly attached to one of the fiber layers of the first fabric, the matrix resin of the fiber layer may be used as the material that bonds the two fabrics together. This may be achieved under suitable heat and/or pressure. Alternatively, the first and second fabrics may be bonded by means of a separate layer of adhesive, which may or not be similar to the matrix resin employed in the first fabric. Such adhesives may be applied by spraying, dipping, roller coating, application as a film, extrusion coating, or any other suitable technique. Again, heat and/or pressure may be used to bond the two fabric layers together. Furthermore, if the second fabric includes a matrix resin that resin may be the vehicle by which the two fabric layers are attached. Other bonding techniques may also be employed.

One or more plastic films can be included in the composite structure for a variety of reasons, such as to permit different adjacent composite layers to slide over each other. This permits ease of forming into a body shape and ease of wearing, as well as other desirable properties. These plastic films may typically be adhered to one or both surfaces of the first fabric. Any suitable plastic film may be employed, such as films made of polyolefins. Examples of such films are linear low density polyethylene (LLDPE) films, ultrahigh molecular weight polyethylene (UHMWPE) films, polyester films, nylon films, polycarbonate films and the like. These films may be of any desirable thickness. Typical thicknesses range from about 0.1 to about 1.2 mils (2.5 to 30 µm), more preferably from about 0.2 to about 1 mil (5 to 25 µm), and most preferably from about 0.2 to about 0.5 mils (5 to 12.5 µm). Most preferred are films of LLDPE.

For example, the two unidirectionally oriented high tenacity fiber layers which are bonded together and cross-plied may have plastic films applied to one or preferably both sides. The inner plastic film is then in contact with the second fabric and is used as the material which bonds the first and second fabrics together. This can be achieved under heat and/or pressure. The outer plastic film provides the structure with a degree of slipperiness so that when a plurality of composite fabrics are stacked together they can slide over each other. A plastic film may also be applied to the exposed outer surface of the second fabric, if desired Following bonding of the first fabric and second fabrics together, they may be cut to the desired shape or wound up in a roll for further processing.

An article may be formed from a number of layers of the composite fabric structure (whether it be a two fabric layer structure, a three layer fabric structure, a four layer fabric structure, or a structure with additional layers). The number of layers of the composite fabric structure that are present in such an article depends upon a variety of factors, including the type of application, desired weight, etc. For example, in a ballistic resistant article such as a vest, the number of layers of the two fabric composite structure may range from about 2 to about 60, more preferably from about 8 to about 50, and most preferably from about 10 to about 40. Such layers may be combined without bonding the several layers together in a conventional manner, such as by stitching only along the edges. To form such an article, the composite fabric can be cut into the desired shape.

Various configurations of the composite fabric can be made based on the desired application, ballistic threat and desirable properties such as flame retardancy, durability and water repellency, among others. For example, one can use aramid materials for both the second multi-directionally oriented fabric layer and for both of the fiber layers of the first unidirectional fabric layer, or high tenacity polyethylene fibers for both such fabric layers. Alternatively, the high tenacity polyethylene fibers and aramid fibers may be combined in any desired combination, such as the first fabric being an aramid fabric and the second fabric being a high tenacity polyethylene fabric, or the first fabric being a high tenacity polyethylene fabric and the second fabric being an aramid fabric. In another embodiment, a graphite first fabric may be attached to a high tenacity polyethylene fiber woven second fabric, or a PBO first fabric may be attached to an aramid woven second fabric. These materials could be arranged in any desired configuration. Other combinations of high tenacity fibers may be employed.

As mentioned above, additional fabric layers may be present in the composite fabric, and such layers may be unidirectionally oriented fabrics or multi-directionally oriented fabrics.

To form one preferred composite fabric of this invention, a preferred method includes supplying first and second fiber layers each comprising non-woven unidirectionally oriented fibers in a resin matrix, with the fibers of each layer comprising high tenacity fibers. The fibers may be of the same or different chemical types. A first surface of the second fiber layer is bonded to a second surface of the first fiber layer, and the layers are cross-plied such that the fibers in the second fiber layer are arranged at an angle with respect to the direction of the unidirectionally oriented fibers of the first layer.

A plastic film may be applied to both outer surfaces of the first and second fiber layers (namely the first surface of the first layer and the second surface of the second layer) or just the outer surface of the second fiber layer. A second fabric comprising multi-directionally oriented, high tenacity fibers is bonded to the first fabric by means of the contacting plastic film. As a result, a composite fabric is formed. The second fabric may include a resin matrix as well (third resin matrix).

The composite fabrics of this invention can be used in a wide variety of applications, such as ballistic products, structural products, components in the automotive and aerospace industries, etc. Preferred applications are soft or hard armor products, such as bullet resistant body armor (vests and the like), vehicle panels, etc.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A composite was formed from layers of unidirectionally oriented aramid fibers and an aramid woven fabric. The unidirectionally oriented non-woven fabric was in the form of a cross-ply structure of unidirectional aramid fiber layers (cross-plied at 0°/90°). Each unidirectional aramid layer is coated with a styrene-isoprene-styrene elastomer (Kraton® D1107) having a tensile modulus of 200 psi (1.4 MPa). Liner films of low density polyethylene were attached to the outer layers of the fiber layers. The weight of the coating was 16±2%. After the fiber layers are cross-plied, the polyethylene films are laminated on both sides of the material under heat and pressure. Each film weighs 7 g/m² and has a thickness of 7 microns. The total areal density of this material is 124 g/m² and the thickness is 0.004 inch (0.01 cm).

As the woven fabric there was employed a plain weave aramid fabric having 29 by 29 ends/inch (11.4 by 11.4 ends/cm) weighing 4.5 oz/square yard (152.6 g/m²). No resin was applied to the aramid woven fabric.

All of the samples measured 18×18 inches (45.7×45.7 cm).

Two of the unidirectionally oriented fiber layers were employed and sandwiched the woven aramid fabric. The layers were molded under heat and pressure by preheating in a mold for 10 minutes at 240° F. (116° C.), applying molding pressure of 500 psi (3.5 MPa) for 10 minutes, cooling in the press for 10 minutes until a temperature of 160° F. (71° C.) is achieved, then removing the sample from the mold and allowing it to cool to room temperature. The low density polyethylene films bond all of the layers together.

Samples were prepared for ballistic resistance testing using 12 layers of the composite fabric. The combined structure had a theoretical areal density of 0.98 psf (4.81 kg/m²) and an weight of 2.19 pounds (0.99 kg). The sample was tested for ballistic resistance in accordance with MIL-STD-662E using a 17 grain fragment simulating projectile (FSP) conforming to MIL-P-46593A. The results are shown in Table 1, below.

The composite was tested for ballistic fragment protection per test method MIL-STD-662E and the fragments used conformed to MIL-P-46593A These fragments were 17 grain, 22 caliber, FSP hardened fragment simulators. One measure of the protective power of a sample composite is expressed by citing the impacting velocity at which 50% of the projectiles are stopped. This velocity, expressed in units of feet per second, is designated the $V_{50}$.

Example 2

Comparative

Samples were formed from 39 layers of the unidirectionally oriented aramid non-woven fabric used in Example 1. The theoretical areal density was 0.99 psf (4.85 kg/m²) and the weight was 2.22 pound (1.01 kg). The ballistic results are also shown in Table 1, below.

Example 3

Comparative

Samples were formed from 32 layers of the aramid woven fabric layer used in Example 1. The theoretical areal density was 1.00 psf (4.90 kg/m²) and the weight was 2.28 pound (1.04 kg). The ballistic results are also shown in Table 1, below.

Example 4

Comparative

A sample was formed from the unidirectionally oriented aramid non-woven fabric used in Example 1, together with the aramid fabric used in Example 1. The aramid fabric was sandwiched between layers of the non-woven fabric but was not bonded thereto. A total of 12 layers of the combined 3 layered structure was used. The theoretical areal density was 0.98 psf (4.81 kg/m²) and the weight was 2.22 pound (1.01 kg). The ballistic results are also shown in Table 1, below.

TABLE 1

| Example | Layers | 17 grain FSP V50, fps (mps) |
|---|---|---|
| 1 | 12 | 1917 (584.6) |
| 2* | 39 | 1762 (537.4) |
| 3* | 32 | 1983 (604.8) |
| 4* | 12 | 1862 (567.9) |

*= comparative example

Example 5

Samples were prepared from 12 layers of the combined fabric as in Example 1. The samples had a theoretical areal density of 0.98 psf (4.81 kg/m²) and an weight of 2.20 pounds (1.00 kg). The sample was tested for ballistic resistance in accordance with MIL-STD-662E using a 9 mm full metal jacket (FMJ) 124 grain bullet. The V50 ratings and back face deformation were determined. The ballistic results are shown in Table 2, below.

Example 6

Comparative

Samples were formed from 39 layers of the unidirectionally oriented aramid non-woven fabric used in Example 5. The theoretical areal density was 0.99 psf (4.85 kg/m²) and the weight was 2.22 pounds (1.00 kg). The ballistic results are also shown in Table 2, below.

Example 7

Comparative

Samples were formed from 32 layers of the aramid woven fabric layer used in Example 5. The theoretical areal density was 1.00 psf (4.90 kg/m²) and the weight was 2.29 pound (1.04 kg). The ballistic results are also shown in Table 2, below.

Example 8

Comparative

A sample was formed from the unidirectionally oriented aramid non-woven fabric used in Example 6, together with the aramid fabric used in Example 7. The aramid fabric was sandwiched between layers of the non-woven fabric but was not bonded thereto. A total of 12 layers of the combined 3 layered structure was used. The theoretical areal density was 0.98 psf (4.81 kg/m²) and the weight was 2.22 pound (1.01 kg). The ballistic results are also shown in Table 2, below.

TABLE 2

| Example | Layers | 9 mm FMJ V50, fps (mps) | Backface deformation, mm |
|---|---|---|---|
| 5 | 12 | 1715 (523.0) | 34 |
| 6* | 39 | 1640 (500.2) | 36 |
| 7* | 32 | 1669 (509.0) | 45 |
| 8* | 12 | 1635 (498.6) | 36 |

*= comparative example

The results show that by laminating a cross-ply unidirectional non-woven fabric of high tenacity fibers with a woven fabric of high tenacity fibers, the ballistic performance in terms of V50 is surprisingly increased, and the backface deformation is reduced.

The present invention provides a composite fabric that is relatively simple to manufacture and has excellent ballistic and other desirable properties. The fabrics are bonded together which yields improved ballistic performance.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A multilayered composite fabric, said composite fabric comprising:
   (a) a first fabric comprising a first fiber layer and a second fiber layer, said first fiber layer comprising non-woven unidirectionally oriented fibers in a first resin matrix, said fibers comprising high tenacity fibers, said first fiber layer comprising first and second surfaces, said second fiber layer comprising non-woven unidirectionally oriented fibers in a second resin matrix, said fibers comprising high tenacity fibers, said second fiber layer comprising first and second surfaces, said first surface of said second fiber layer being adjacent to said second surface of said first fiber layer, said fibers in said second fiber layer being arranged at an angle with respect to the direction of the unidirectionally oriented fibers of said first fiber layer; and
   (b) a second fabric comprising multi-directionally oriented fibers optionally in a third resin matrix, at least about 50 percent by weight of said fibers of said second fabric comprising high tenacity fibers, said high tenacity fibers being selected from the group consisting of high tenacity polyethylene fibers, aramid fibers, and blends thereof, said second fabric having first and second surfaces, said first surface of said second fabric being adjacent to said second surface of said second fiber layer, and said second fabric being directly or indirectly bonded to said first fabric thereby forming said composite fabric.

2. The composite fabric of claim 1 wherein said second fabric comprises a fabric selected from the group consisting of woven fabrics, knitted fabrics, braided fabrics, felted fabrics and paper fabrics.

3. The composite fabric of claim 1 wherein said first and second fabrics are bonded by an adhesive.

4. The composite fabric of claim 1 further comprising at least one plastic film, said plastic film being located between said first and said second fabric layers, said plastic film bonding said first and second fabrics together.

5. The composite fabric of claim 4 further comprising a plastic film bonded to said first surface of said first fiber layer.

6. The composite fabric of claim 1 wherein said high tenacity fibers of said first fabric are selected from the group consisting of polyolefin fibers, aramid fibers, polybenzazole fibers, polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and blends thereof.

7. The composite fabric of claim 1 wherein said high tenacity fibers of said first fabric are selected from the group consisting of high tenacity polyethylene fibers, aramid fibers, and blends thereof.

8. The composite fabric of claim 1 wherein said high tenacity fibers of said first fabric are chemically the same as the high tenacity fibers of said second fabric.

9. The composite fabric of claim 1 wherein said second fabric is in the form of a woven fabric.

10. The composite fabric of claim 1 wherein said high tenacity fibers of said first fabric comprise aramid fibers and said high tenacity fibers of said second fabric comprise aramid fibers.

11. The composite of claim 10 wherein said fibers of said second fabric layer comprise aramid fibers.

12. The composite fabric of claim 10 wherein said second fabric is in the form of a woven fabric.

13. The composite fabric of claim 1 wherein said first and second fiber layers are disposed such that the fiber direction of said first fiber layer is at an angle of about 90° with respect to the fiber direction of said fibers of said second fiber layer.

14. A ballistic article comprising the multilayered composite fabric of claim 1.

15. A ballistic article comprising from about 2 to about 60 layers of said multilayered composite fabric of claim 1.

16. The composite fabric of claim 1 wherein said high tenacity fibers of said first fabric comprise high tenacity polyethylene fibers and said high tenacity fibers of said second fabric comprise high tenacity polyethylene fibers.

17. The composite fabric of claim 1 wherein said second fabric contains no matrix resin.

18. The composite fabric of claim 1 wherein said fibers of said first fiber layer are fully embedded in said first resin matrix and said fibers of said second fiber layer are fully embedded in said second resin matrix.

19. The composite of claim 1 wherein substantially all of said fibers of said second fabric are said high tenacity fibers.

20. The composite of claim 1 where said high tenacity fibers of said first fabric and said high tenacity fibers of said second fabric have a tenacity of at least about 22 g/d.

21. A multilayered ballistic resistant composite fabric, said composite fabric comprising:
  (a) a first fabric comprising a first fiber layer and a second fiber layer, said first fiber layer comprising non-woven unidirectionally oriented fibers in a first resin matrix, said fibers comprising high tenacity fibers, said first fiber layer comprising first and second surfaces, said second fiber layer comprising non-woven unidirectionally oriented fibers in a second resin matrix, said fibers comprising high tenacity fibers, said second fiber layer comprising first and second surfaces, said first surface of said second fiber layer being adjacent to said second surface of said first fiber layer, said fibers in said second fiber layer being arranged at an angle with respect to the direction of the unidirectionally oriented fibers of said first fiber layer;
  (b) optionally a first plastic film bonded to said first surface of said first fiber layer of said first fabric;
  (c) a second plastic film bonded to said second surface of said second fiber layer of said first fabric; and
  (d) a second fabric comprising multi-directionally oriented fibers optionally in a third resin matrix, at least about 50 percent by weight of said fibers of said second fabric comprising high tenacity fibers, said high tenacity fibers being selected from the group consisting of high tenacity polyethylene fibers, aramid fibers, and blends thereof, said second fabric having first and second surfaces, said first surface of said second fabric being bonded to said second plastic film.

22. The composite fabric of claim 21 wherein said high tenacity fibers of said first fabric comprise high tenacity polyethylene fibers and/or aramid fibers.

23. The composite fabric of claim 22 wherein said first and second fiber layers are disposed such that the fiber direction of said first fiber layer is at an angle of about 90° with respect to the fiber direction of said fibers of said second fiber layer.

24. The composite fabric of claim 23 wherein said second fabric is in the form of a woven fabric.

25. A method of forming a composite fabric structure, said method comprising:
  (a) supplying a first fiber layer comprising non-woven unidirectionally oriented fibers in a first resin matrix, said fibers comprising high tenacity fibers, said first fiber layer comprising first and second surfaces;
  (b) supplying a second fiber layer comprising non-woven unidirectionally oriented fibers in a second resin matrix, said fibers comprising high tenacity fibers, said second fiber layer comprising first and second surfaces;
  (c) bonding said first and second fiber layers together such that said first surface of said second fiber layer is adjacent to said second surface of said first fiber layer, said fibers in said second fiber layer being arranged at an angle with respect to the direction of the unidirectionally oriented fibers of said first fiber layer;
  (d) optionally applying a first plastic film to said first surface of said first fiber layer;
  (e) applying a second plastic film to said second surface of said second fiber layer;
  (f) supplying a second fabric comprising multi-directionally oriented fibers optionally in a third resin matrix, at least about 50 percent by weight of said fibers of said second fabric comprising high tenacity fibers, said high tenacity fibers being selected from the group consisting of high tenacity polyethylene fibers, aramid fibers, and blends thereof, said second fabric having first and second surfaces; and
  (g) bonding said first surface of said second fabric to said second plastic film to thereby form said composite fabric.

26. The method of claim 25 wherein said second fabric comprises a woven fabric.

27. The method of claim 25 wherein said high tenacity fibers of said first fabric comprise high tenacity polyethylene fibers and/or aramid fibers.

* * * * *